Patented July 23, 1946

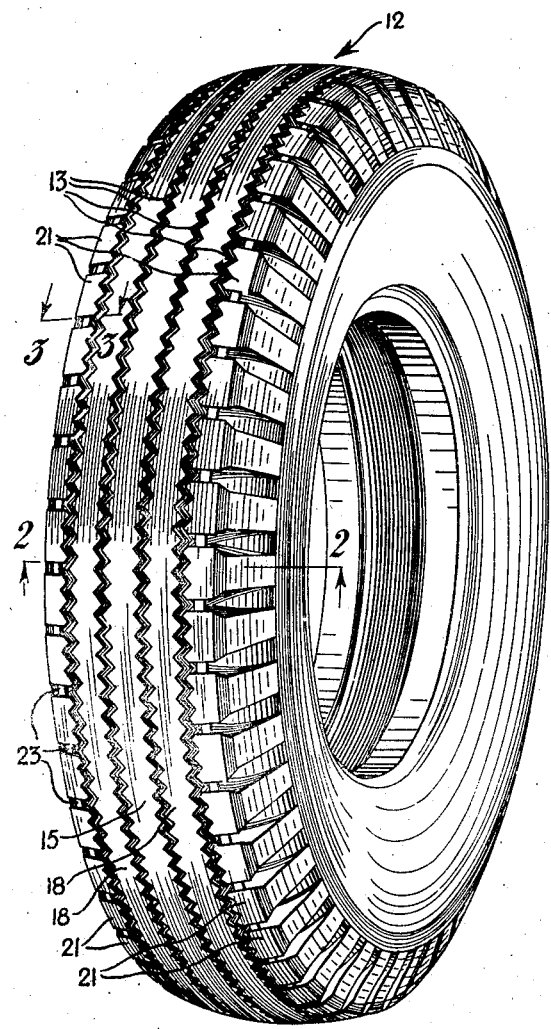
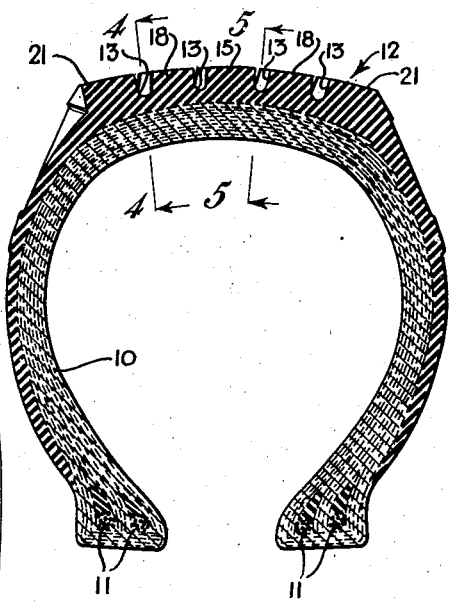
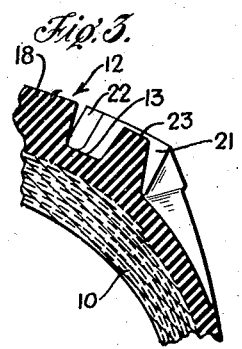
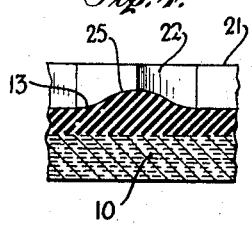
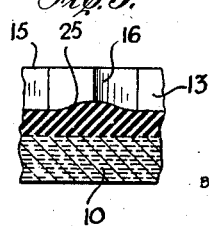

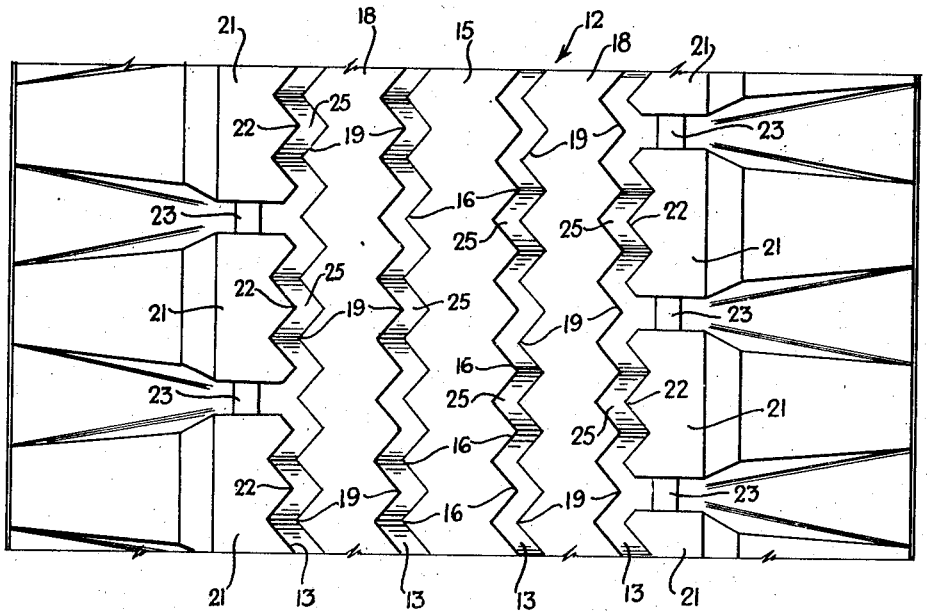

2,404,579

UNITED STATES PATENT OFFICE 2,404,579

TIRE CONSTRUCTION

William S. Coben, Akron, Ohio, assignor to The Firestone Tire & Rubber Company, Akron, Ohio, a corporation of Ohio Application October 21, 1941, Serial No. 415,851

1 Claim. (Cl. 152—209)

This invention relates to tire constructions, and more especially it relates to improved design of the tread portions of pneumatic tire casings. The invention has been found to be of primary utility in its application to large heavy duty tires, such as truck tires, which are subject to relatively heavy loads and severe service conditions.

The chief objects of the invention are to improve the wearing qualities of pneumatic tires; to improve the traction and anti-skid characteristics thereof; and to provide a tire tread that has a cooling effect on a tire at the hinge-points thereof. Other objects will be manifest as the description proceeds.

Of the accompanying drawings:

Fig. 1 is a perspective view of a pneumatic tire casing embodying the invention;

Fig. 2 is a section, on a larger scale, on the line 2—2 of Fig. 1;

Fig. 3 is a section, on a larger scale, on the line 3—3 of Fig. 1;

Fig. 4 is a section on the line 4—4 of Fig. 2;

Fig. 5 is a section on the line 5—5 of Fig. 2; and

Fig. 6 is a fragmentary developed plan view, on a larger scale, of the tread portion of the tire shown in Fig. 1.

Referring to the drawings, there is shown a tire comprising the usual carcass 10 of a plurality of fabric plies, dual bead cores 11, 11 at each margin of said carcass, as is conventional practice in heavy duty tire construction, and a tread structure, designated as a whole by the numeral 12, on the periphery of the said carcass. Said tread structure is formed with a plurality of circumferentially extending driving or traction elements which for convenience may be designated as "central," "intermediate," and "lateral" elements, said elements being separated by circumferentially extending grooves 13, 13.

The "central" traction element is a rib 15 that is symmetrically disposed along the centerline of the tread, equidistant from the lateral margins or shoulders thereof. The respective lateral faces of the rib 15 are serrated, that is, they are formed with a succession of lugs 16, 16 that are wedge shape in plan, and which project into the grooves 13 at opposite sides of the rib. The lugs 16 on one side of the rib are disposed in staggered relation to the lugs on the other side of the rib, as is most clearly shown in Fig. 6.

The "intermediate" traction elements are circumferential ribs 18, 18 that are disposed adjacent the rib 15 on opposite sides thereof. The ribs 18 as shown are identical with the rib 15 except in one important feature, namely, they are somewhat narrower than said rib 15. Like the latter, the lateral faces of the ribs 18 are serrated, the lugs that constitute the serrations being designated 19, 19. The lugs 19 on opposite sides of each rib 18 are in staggered relation to each other, and on that side of each rib 18 that is nearest the rib 15, the lugs 19 are in staggered relation to the lugs 16 of the said rib 15. The arrangement is such that the grooves 13 between the rib 15 and ribs 18 has a zig-zag appearance.

The "lateral" traction elements are disposed at the respective margins of the tread, which are the shoulders or hinge points of the tire. Each of said lateral traction elements consists of a circumferential series of blocks 21, 21 that are longitudinally spaced apart from each other, said blocks being of greater length than width and being disposed end to end.

The lateral face of each block 21 that confronts an intermediate rib 18 is serrated, the wedge-shaped lugs that constitute the serrations being designated 22. The lugs 22 are disposed in staggered relation to the lugs 19 of the adjacent rib 18 so that the intervening groove 13 is of zig-zag appearance. The opposite face of each block 21 is sloped from the circumferentially arranged margin of the block to the sidewall of the tire. A characteristic feature of the "lateral" traction elements is their transverse width, which width is less than the width of the "intermediate" elements 18 on the ground-engaging surface of the elements. It will also be observed that the blocks 21 on one side of the tread are staggered with relation to the blocks 21 on the opposite side of the tread. Adjacent blocks 21 of each series are connected to each other by ribs 23 that are integral therewith, said ribs being of narrower width than the blocks, and being somewhat lower in height, as is best shown in Fig. 3.

The grooves 13 that separate the traction elements are not of uniform depth throughout the circumference of the tire, but have local regions of shallower depth, which regions are spaced apart from each other a distance equal to the spacing of three of the lugs 16 or 19. The regions of shallower depth are produced by upward swells or bulges 25 in the bottom of the grooves, which swells or bulges are located at the apexes of lugs that constitute the serrations of the traction elements. The function of said bulges 25 is to impede the progress of flex cracks that may originate in the bottom of the grooves 13.

The invention provides a tire having a greater proportion of its rubber at the center of its tread where service conditions are most severe, with the result that the wearing quality of the tire is improved. Furthermore, the provision of narrower traction elements toward the sides of the tread increases the flexibility thereof and improves its traction and non-skid characteristics. The feature of providing lateral traction elements in the form of blocks contributes to the flexibility and traction characteristics of the tread, and also exerts a cooling effect on the tire at the hinge points thereof where flexure produces the greatest heat.

Modification may be resorted to without departing from the spirit of the invention, or the scope thereof as defined by the appended claim.

What is claimed is:

A pneumatic tire comprising a tread portion formed with a plurality of traction elements, said traction elements comprising endless circumferentially extending ribs in the central area of the tread and a circumferential series of longitudinally spaced blocks disposed at the opposite lateral margins of the tread, one of said ribs being wider than the others and being disposed along the center line of the tread, all of said ribs having their lateral faces uniformly and continuously serrated throughout, said blocks being of greater length than width and having one lateral face confronting an outer rib of said tread, said confronting face of said blocks being serrated throughout their length and their other lateral faces being smooth, said blocks being connected to each other by means of a relatively narrow rib whose height is less than the height of the blocks, said traction elements defining circumferential grooves therebetween and the bottom of said grooves having a plurality of upwardly extending bulges at intervals, said intervals being equal to the spacing of three of the said serrations whereby progressive development of a crack in the groove of the tire is prevented.

WILLIAM S. COBEN.